July 16, 1929.        H. JACOB        1,721,398
COMPUTING WEIGHING SCALE
Filed July 29, 1927        2 Sheets-Sheet 1
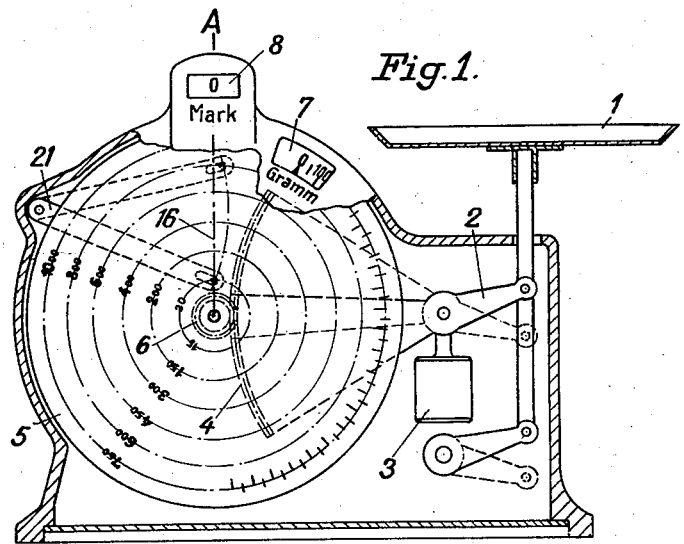
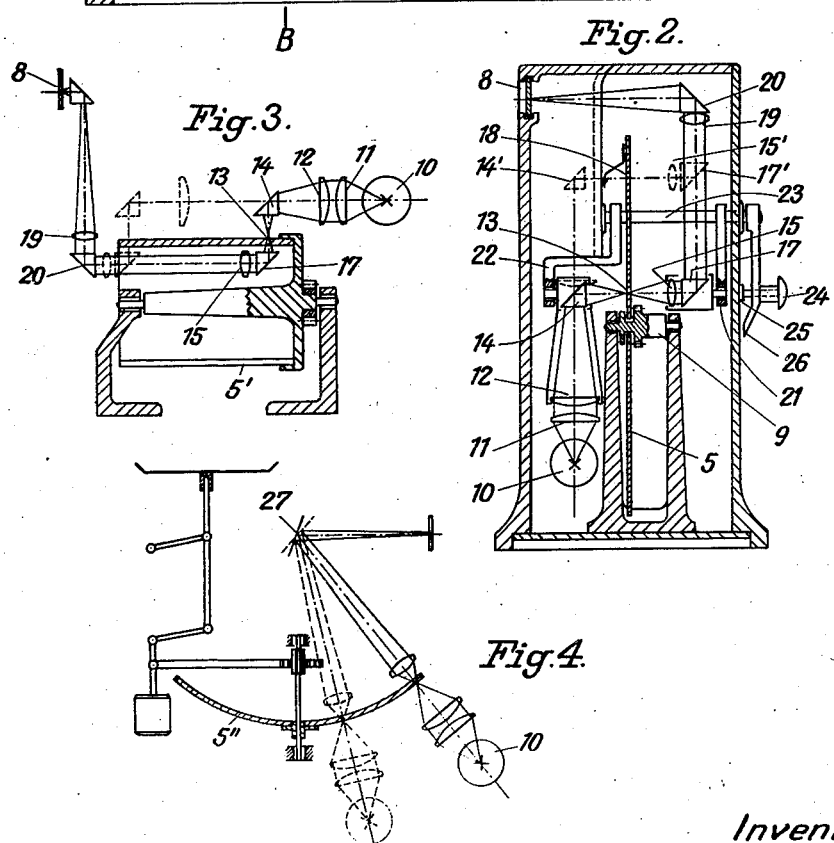
Inventor:
HEINRICH JACOB
BY HIS ATTORNEYS
Howson and Howson Patented July 16, 1929.

1,721,398

UNITED STATES PATENT OFFICE.

HEINRICH JACOB, OF BERLIN-FRIEDENAU, GERMANY.

COMPUTING WEIGHING SCALE.

Application filed July 29, 1927, Serial No. 209,268, and in Germany August 2, 1926.

This invention relates to a computing weighing scale, that is to a scale which is adapted to automatically indicate the price of a certain quantity by weight of a commodity which is put on the load support if the mechanism of the scale has been adjusted for the price per unit of weight of the commodity in question. Weighing scales of this kind are provided with a carrier of price or money value numerals which is automatically adjusted according to the weight of the commodity on the load support, and are provided with an optical projecting device which is adapted to project the numeral indicating the price of the article from said adjustable carrier to a window or reading screen within the casing of the scale.

Now this invention has for its purpose to provide an improved scale construction wherein the price numerals, arranged in rows on a transparent carrier, each row corresponding to a separate price range per unit of weight, are projected in sharp and bright form on an invariable portion of the reading screen. The fixed position of the projected images of the price numerals makes it possible to provide a reading screen of comparatively small dimensions only in spite of high magnification of price numerals, so that the clearness of the projecting image cannot be disturbed by glaring effects produced by light falling from outside on the window.

A further valuable feature of the scale according to the invention consists therein that the customer is allowed to always inspect besides the price numeral indicating the money value of the bought article projected on the reading screen the weight of the article in a further window of the casing wherein a portion of a weight graduation, provided on the adjustable carrier of the price numerals, is directly displaced. Such weight graduation being preferably provided at the outer margin of a rotatable flat disc whereon the price indicating numerals are provided on concentric rings, the higher price numerals being provided on outer circles and the lower price numerals on inner circles, the numerals being positioned tangentially to the circles standing upright in the direction of the radii of the disc. This arrangement of the numerals complies with the requirement that the higher price numerals require more space than the numerals of lower money value, and that in order to lodge on the disc as many circles of different price ranges as possible it is necessary to bring adjacent circles as close to each other as possible.

Figure 5:
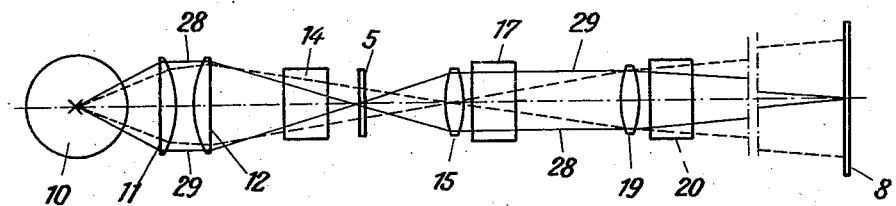
Figure 6:
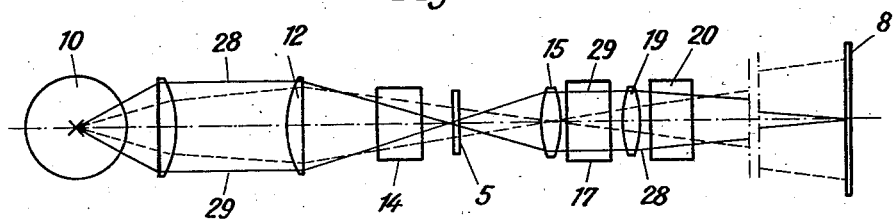

The invention is illustrated on the accompanying drawing wherein Figure 1 shows a diagrammatic section through a computing weighing scale provided with a rotatable disc carrying the price numerals and adjusted by the weighing mechanism under the action of the load. Figure 2 is a cross section through the scale. Figure 3 is a diagrammatic illustration of a price number carrier for a weighing scale in the form of a drum and of an illuminating and a projecting system in conformity with the invention coordinated to said rotatable drum. Figure 4 is a diagrammatic illustration of a weighing mechanism actuating a price numeral carrier in the form of a segment of a sphere and of an illuminating and a projecting device for producing images of the price numerals provided on the sphere on a reading screen. Figures 5 and 6 are diagrammatic illustrations of the path of the rays emitted by a lamp under the influence of the illuminating and of the projecting system illustrated in Figure 2, each of the figures showing the path of the rays for one of two different positions of the movable elements of the optical device.

In the several figures of the drawing corresponding parts are designated with the same numerals.

1 designates the load support or platform of the scale, 2 is the scale beam or lever, and 3 a weight firmly connected thereto. 4 is a toothed rack connected to lever or beam 2 and meshing with a pinion 6 on the axle of a flat transparent disc 5 whereon a system of numerals is provided on concentric circles, each circle corresponding to a special price range of the commodity put on the load support. The numerals are put upright along the circles parallel to the radii of disc 5, only a few numerals being illustrated in Figure 1 of the drawing. At the outer margin of disc 5 a weight graduation is provided, a portion of which being visible within a window 7 in the casing of the scale and indicating the weight of the commodity on platform 1. The casing contains besides window 7 a window 8 formed for instance by a ground glass whereon the price numerals provided on disc 5 are projected by a suitable projecting device which will hereafter be described.

Figure 2 shows disc 5 as mounted on an axle 9 rotatable within suitable standards. 10 designates a fixed lamp, and 11 and 12 two positive lenses forming a condenser for the illumination of disc 5 at the point 13. 14 is a reflecting prism in firm connection with lens 12 adapted to deviate the light rays coming from the lens towards disc 5. The lamp 10, lenses 11, 12 and reflecting prism 14 form together the illuminating system for disc 5. On the opposite side of the disc a projecting system is provided comprising two lenses 15 and 19, each having coordinated thereto a reflecting prism, the prisms being designated 17 and 20 respectively. Lens 15 and prism 17 are connected with each other and with lens 12 and prism 14 of the illuminating system and can be moved radially to disc 5 in the direction of line 16. Two different positions of the said elements of the illuminating and of the projecting system are indicated in Figure 2 of the drawing, one in full lines and the other in dotted lines; the latter position being indicated by 12', 14' and 15', 17' respectively. The focal length of lens 19 is equal to the length of the light path between said lens and window 8 in order to produce a sharp image of the price numerals on the reading screen provided in the window. The focal length of lens 15 is equal to its distance from disc 5. It appears that the diverging rays issuing from the price numerals of disc 5 such as from point 13 of the disc impinging on lens 15 leave said lens in parallelism and therefore after passing through prism 17 impinge on lens 19 likewise in parallelism. On account of the parallelism of the rays between prism 17 and lens 19 prism 17 together with lens 15 may be shifted parallel to the plane of disc 5 without impairing the clearness of the image of the price numeral produced by the projecting system on the reading screen in window 8.

In the illuminating system on the opposite side of disc 5 the rays coming from lamp 10 leave lens 11 of the condenser likewise substantially in parallelism, so that the shifting of lens 12 with prism 14 does not materially affect the light concentration on disc 5. The coupling of the shiftable elements of the illuminating system with those of the projecting system is effected by levers 21, 22 connected to shaft 23. Outside the casing a pointer 26 with a knob 24 is mounted on shaft 23 allowing actuation thereof with the effect of shifting the movable elements of the illuminating and of the projecting device along line 16 so that the said systems may be adjusted at will to any of the several price range circles on disc 5. Locking elements 25 are provided to properly position pointer 16 and to secure it in adjusted position.

The operation of the scale is as follows: Assuming a certain quantity of a commodity has been sold the price of which per unit of weight being for instance 2 marks. The operator then adjusts, by grasping knob 24, the pointer 26 to the 2 marks price range circle and puts the article on platform 1. The weighing mechanism then automatically adjusts disc 5 according to the weight of the article. Thereby the price numeral on the price range circle on which the mechanism has been adjusted is brought within the field as well of the illuminating system as of the projecting system so that this numeral is projected towards window 8 and can be read on the reading screen. The path of the marginal rays of the optical systems for two different positions of the movable members thereof is illustrated in full lines in Figures 5 and 6 respectively. The figures show that the marginal rays 28 and 29 after passing through transparent disc 5 and lens 15 are in parallelism to each other and are united to an image point in window 8 by lens 19 and prism 20 no matter of what is the position of the movable elements 15, 17. The dotted lines in Figures 5 and 6 show the boundaries of the illuminated fields on disc 5 and window 8 respectively. Simultaneously with the displaying of the price numeral in window 8 by projection, a displaying of the weight of the article at the weight graduation takes place in window 7.

Figure 3 shows the optical device according to the invention in connection with a cylindrical carrier for the price numerals; the cylinder being designated 5'. The optical device being fully in conformity with that already described no further explanation for this modification is required.

In Figure 4 an embodiment is diagrammatically illustrated where the price numeral carrier has the form of a section of a sphere designated 5'', this sphere being adjusted under the influence of the load by rotation about the axis of the sphere. The illuminating system consists of a lamp 10 with coordinated condenser and the projecting system of a lens and a reflector 27 positioned at the centre of the sphere. The price numerals on the sphere for different price ranges are again arranged along circles with the axis of rotation of the sphere as centre. The optical system is made adjustable to the several price range circles by communicating to it a swinging movement about the centre of the sphere in a meridional plane the angle of oscillation of reflector 27 being only half that of the optical system proper.

What I claim is:

1. In a computing weighing scale a transparent carrier of price numerals arranged along a plurality of circles, each circle corresponding to a particular price range, said carrier in operative connection with the weighing mechanism and automatically adjusted thereby by rotation about an axis containing the centres of all the numeral circles of the transparent carrier, an illuminating device and a device for the optical projection of the price numeral comprising a movable element adapted to be adjusted with relation to the price numeral carrier and a fixed window or reading screen, the projecting device adapted to produce an image of the price numerals on a fixed portion of said window irrespective of the adjustment of its movable element.

2. In a computing weighing scale a transparent carrier of price numerals arranged along a plurality of circles, said carrier adapted for automatic adjustment according to the weight on the load support, an illuminating device for said transparent carrier, a device for the optical projection of the price numerals on said carrier and a window, the projecting device comprising two objectives at least one of which has coordinated thereto a reflector the last named objective being movable together with the coordinated reflector substantially in the direction of the rays leaving the reflector towards the second objective which is fixedly mounted, the focal length of the movable objective being equal to the length of the light path between the numerals on the transparent carrier and the said objective in all its positions.

3. In a computing weighing scale a transparent flat disc carrying price numerals arranged along a plurality of concentric circles, the disc adapted to be automatically rotated about the centre of the numeral circles in accordance with the weight positioned on the load support, an illuminating device for said disc, a device for the optical projection of the numerals on the disc and a window whereon the numerals on the disc are projected by said projecting system, the projecting device comprising two objectives, each having coordinated thereto a reflector, one of the said two objectives with its reflector being movable and the other stationary, the path of the movable system and of the rays leaving the system being parallel as well to the plane of the disc as to the direction of a radius of the disc, the focal length of the movable objective being equal to the length of the light path between the disc and the objective.

4. In a computing weighing scale a transparent flat disc carrying price numerals arranged along a plurality of concentric circles, the disc adapted to be automatically rotated about the centre of the numeral circles in accordance with the weight positioned on the load support, an illuminating device for said disc consisting of a lamp and of a projecting system, said system comprising a fixed and a movable lens element and a reflector in rigid connection with said movable lens element, the two lens elements being coaxial with each other and the reflector arranged in the path of the illuminating rays coming from the movable lens element so as to receive light from the movable lens and to throw it on the rotatable disc, the direction of movement of the lens being parallel to the plane of the rotatable disc, and the focal length of the fixed lens element being substantially equal to its distance from the lamp and that of the movable lens element equal to the length of the light path between the lens and that point of the disc whereon the light is thrown, a device for the optical projection of the numerals on the disc and a window whereon the numerals are projected, the projecting device comprising two objectives, each having coordinated thereto a reflector, one of the said two objectives with its reflector being movable and the other stationary, the path of the movable system and of the rays leaving the system being parallel as well to the plane of the disc as to the direction of a radius of the disc, the focal length of the movable objective being equal to the length of the light path between the disc and the objective.

In testimony whereof I have signed my name to this specification.

HEINRICH JACOB.